United States Patent [19]

Inaba et al.

[11] Patent Number: 5,246,643
[45] Date of Patent: Sep. 21, 1993

[54] DISCRIMINATION METHOD FOR MAINTENANCE TIMING FOR INJECTION MOLDING MACHINES

[75] Inventors: Yoshiharu Inaba, Kawasaki; Masao Kamiguchi, Oshino; Noriaki Neko, Oshino; Osamu Saito, Oshino, all of Japan

[73] Assignee: Fanuc Ltd, Minamitsuru, Japan

[21] Appl. No.: 848,982

[22] PCT Filed: Aug. 31, 1991

[86] PCT No.: PCT/JP91/01167

§ 371 Date: Apr. 20, 1992

§ 102(e) Date: Apr. 20, 1992

[87] PCT Pub. No.: WO92/04174

PCT Pub. Date: Mar. 19, 1992

[30] Foreign Application Priority Data

Aug. 31, 1990 [JP] Japan .................................. 2-228087

[51] Int. Cl.$^5$ ............................................. B29C 45/76
[52] U.S. Cl. ................................ 264/40.1; 264/328.1; 425/136; 425/168; 364/476
[58] Field of Search ................... 264/40.1, 40.5, 40.6, 264/40.7, 328.1; 425/136, 161, 162, 168; 364/184, 185, 424.03, 424.04, 473, 476

[56] References Cited

U.S. PATENT DOCUMENTS 3,779,731 12/1973 Pollock et al. .................... 364/184
4,481,589 11/1984 McGowan et al. ............... 364/184
4,740,148 4/1988 Fujita et al. ....................... 364/185

FOREIGN PATENT DOCUMENTS

62-83027 4/1987 Japan .
1-263020 10/1989 Japan .

*Primary Examiner*—Jill L. Heitbrink
*Attorney, Agent, or Firm*—Staas & Halsey

[57] ABSTRACT

A discrimination method for maintenance timing for injection molding machines, detects the respective values of molding process parameters of a plurality of types, including injection time, maximum injection pressure, etc., for each of the injection molding machines (7-1 to 7-M). Up-to-date process parameter values for the molding machine are entered as a set of monitor data in a molding monitor unit (1) every time a predetermined number of molding cycles are executed in each molding machine. A plurality of monitor data values for each type are read, on a time-series basis, from a memory (4) loaded with a plurality of sets of up-to-date monitor data values associated with each molding machine, by means of a microprocessor (2), and dot-line data are generated. Based on an approximate equation of the first degree indicative of the transition trend of each type of monitor data obtained using the dot-line data, an estimated value of the monitor data for a point in time after the present point of time is calculated. A warning message to demand the maintenance of an expendable part of the injection molding machine associated with the monitor data is displayed on the screen of a display unit (6) when it is concluded that the estimated value deviates from an allowable range for the monitor data. Thus, maintenance timing for the injection molding machine can be confirmed without disassembling the injection molding machine.

11 Claims, 7 Drawing Sheets

| i \ U | TI | SM | PM | SC | TE |
|---|---|---|---|---|---|
| 1 | TI1 | SM1 | PM1 | SC1 | TE1 |
| 2 | TI2 | SM2 | PM2 | SC2 | TE2 |
| 3 ⋮ k | TI3 ⋮ TIk | SM3 ⋮ SMk | PM3 ⋮ PMk | SC3 ⋮ SCk | TE3 ⋮ TEk |
| k+1 ⋮ N | TIk+1 ⋮ TIN | SMk+1 ⋮ SMN | PMk+1 ⋮ PMN | SCk+1 ⋮ SCN | TEk+1 ⋮ TEN |

Pj ⇒ (row k)

DISCRIMINATION METHOD FOR MAINTENANCE TIMING FOR INJECTION MOLDING MACHINES

BACKGROUND OF THE INVENTION

1. Field of the Invention

The present invention relates to a method for automatically properly discriminating maintenance timing for injection molding machines.

2. Description of the Related Art

An injection molding machine includes expendable parts, such as an injection screw, heating cylinder, mold, etc. When the properties of the expendable parts gradually worsen due to wear, corrosion, etc., the mold may be insufficiently loaded with a resin, or the dwell pressure applied to the mold at the time of mold clamping may be lowered, so that normal molding operation is hindered. Conventionally, therefore, the injection molding machine is disassembled, for example, to replace an expendable part or parts whose performance is worsened, in case of defective molding. If maintenance of the various expendable parts is carried out after detecting the defective molding, however, production of a large number of defectives cannot be avoided. Moreover, a considerable number of expendable parts are subject to deterioration in case of defective molding, and besides, the relationships between the type of defective molding and the types of the expendable parts affected by the defective molding are complicated, so that much labor is entailed by, for example, operation for specifying the expendable parts which require a counterplan to be considered.

Generally, in order to avoid such an awkward situation, the injection molding machine is periodically disassembled, and its expendable parts are subjected to maintenance and inspection. Since the degrees of deterioration of the expendable parts vary depending on the molding conditions, however, it is difficult to determine the timing for the maintenance and inspection properly. The disassembling operation may possibly damage the injection molding machine. If the maintenance operation is repeated too often, therefore, the injection molding machine is liable to be damaged, or labor is wasted, so that the operating efficiency of the injection molding machine lowers.

SUMMARY OF THE INVENTION

The object of the present invention is to provide a method in which maintenance timing for injection molding machines can be automatically properly discriminated without disassembling the injection molding machines.

In order to achieve the above object, a discrimination method for maintenance timing for an injection molding machine according to the present invention comprises steps of: (a) storing in a storage unit, on a time-series basis, a plurality of sets of up-to-date monitor data values, associated individually with molding cycles for the injection molding machine, including expendable parts of a plurality of types, each set composed of respective values of monitor data of a plurality of types individually cyclically detected; (b) automatically cyclically discriminating respective transition trends of the monitor data of the individual types by discriminating, based on the plurality of monitor data values for the individual types cyclically read out on a time-series basis from the storage unit; (c) automatically cyclically determining whether or not a predetermined deterioration level is reached by at least one type of associated expendable part, by the discriminating of the transition trends; and (d) issuing a warning when it is concluded that the predetermined deterioration level is reached by the at least one type of associated expendable part.

According to the present invention, as described above, the respective transition trends of the monitor data of the individual types are discriminated on the basis of the plurality of monitor data values for the individual types read out on a time-series basis from the storage unit, which stores a plurality of sets of up-to-date monitor data, associated with the molding cycles and each set composed of the monitor data of the plurality of types. The warning is issued when it is concluded, based on the result of this discrimination, that the predetermined deterioration level is reached by the associated expendable part of the injection molding machine. Thus, maintenance and inspection of the expendable part can be demanded before the properties of the expendable part worsen so much that defective molding is caused, so that defective molding attributable to the deterioration of the expendable part can be prevented. Moreover, the degree of deterioration of the expendable part can be properly estimated without disassembling the injection molding machine, so that the operating efficiency of the injection molding machine can be improved.

DESCRIPTION OF THE PREFERRED EMBODIMENT

An injection molding system to which is applied a discrimination method for maintenance timing for injection molding machines according to one embodiment of the present invention will now be described with reference to FIGS. 1 to 7.

Figure 1:
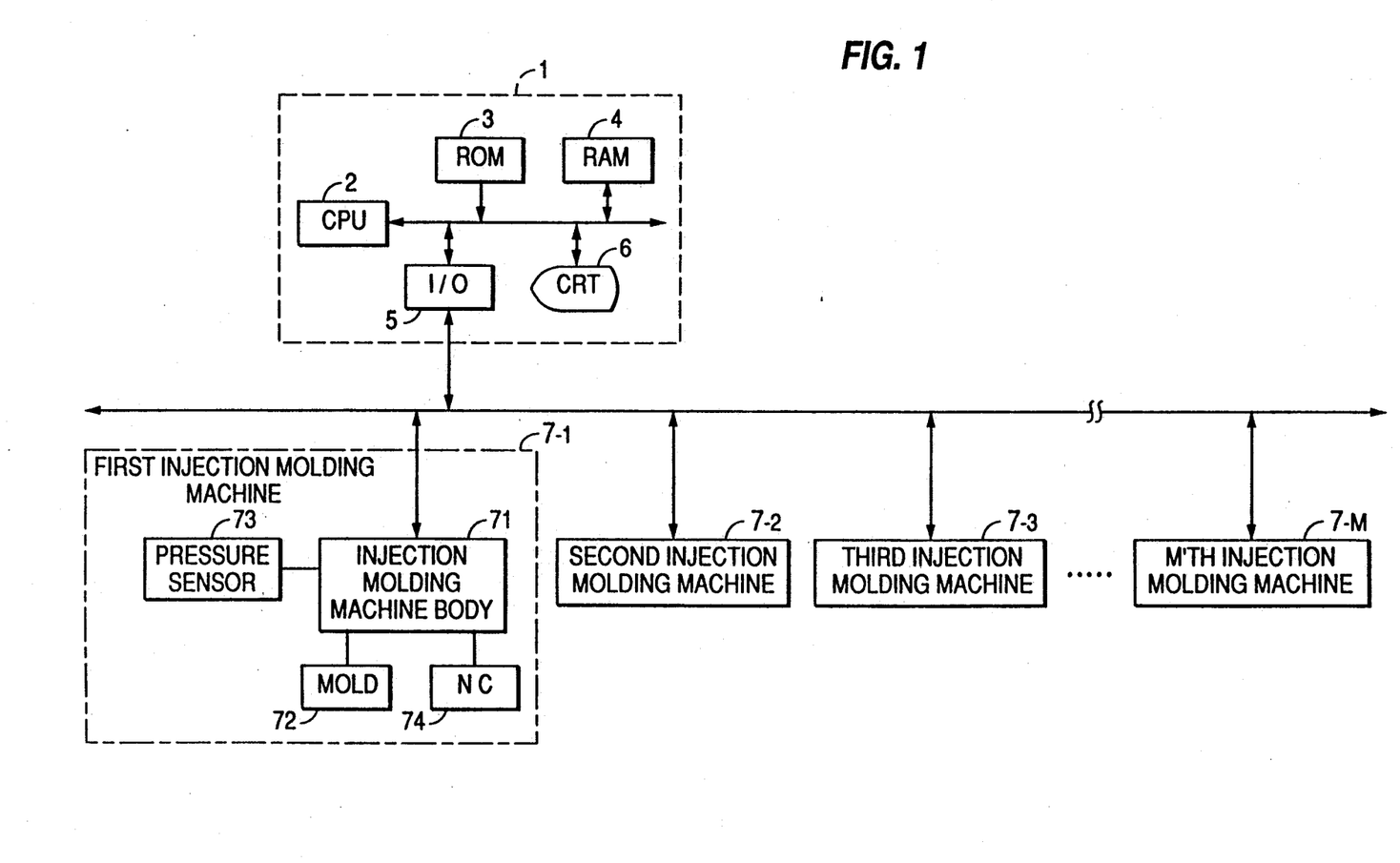
FIG. 1 is a schematic block diagram showing an injection molding system formed of an injection molding machine group and a molding monitor unit, for carrying out a discrimination method for maintenance timing for injection molding machines according to one embodiment of the present invention.

Referring to FIG. 1, the injection molding system comprises an injection molding machine group including first to M'th electrically-operated injection molding machines 7-1 to 7-M of the same configuration and a molding monitor unit 1 for monitoring the operating conditions of the injection molding machine group.

Each of the injection molding machines, as is represented by the first injection molding machine 7-1 shown in FIG. 1, has an injection molding machine body 71 composed of various operating units (not shown), e.g., an injection unit, mold clamping unit, ejector, etc., which are driven individually by means of servomotors. The mold clamping unit is fitted with a mold 72, and the mold 72 is formed having various gates (not shown), through which a molten resin flows, and a gas vent (not shown) for breathing. The injection unit includes a heating cylinder and an injection screw in the heating cylinder, and the injection screw is fitted with a pressure sensor 73 for detecting an axial reaction force of the molten resin acting on the injection screw, as injection pressure and dwell pressure. The heating cylinder, injection screw, and mold 72 are expendable parts whose properties worsen as the injection molding machine is operated.

Further, each of the injection molding machines comprises a numerical control device 74 for driving the operating units. The numerical control device 74 includes various axis servo circuits for individually driving various axis servomotors of the injection molding machine, a numerical control microprocessor (hereinafter referred to as NCCPU) for driving the servo circuits, programmable machine controller microprocessor (hereinafter referred to as PMCCPU) for controlling the sequence operations of the operating units, and various memories for signal transfer between the two processors and storage of control programs for numerical control and sequence control, molding conditions, etc. (none of these elements are shown). Each of the servo circuits includes a current position register for storing a current operating position on a control axis associated with the servo circuit, detected by means of a position sensor attached to its corresponding servomotor, and a torque limit circuit for regulating servomotor output torque.

The molding monitor unit 1 includes a microprocessor (CPU) 2 for use as monitor data analyzing means, a read-only memory (ROM) 3 loaded with programs for monitor data analysis, warning messages, etc., a nonvolatile random access memory (RAM) 4 for use as monitor data storage means, an input-output interface 5 connected with the injection molding machine group, and a CRT display unit 6 for use as display means.

The following is a description of the operation of the injection molding system of FIG. 1.

Each of the first to M'th injection molding machines 7-1 to 7-M repeatedly executes a molding cycle (shot). During the execution of one molding cycle by means of each injection molding machine, the respective values of various process parameters, such as molding cycle time, are cyclically detected, and the detected parameter values are loaded as candidate monitor data into a memory of the numerical control device 74. The molding monitor unit 1 intermittently receives the various process parameter values associated with each injection molding machine as monitor data values, and discriminates the occurrence of deterioration of the various expendable parts of each injection molding machine by the input monitor data values.

Figure 2A:
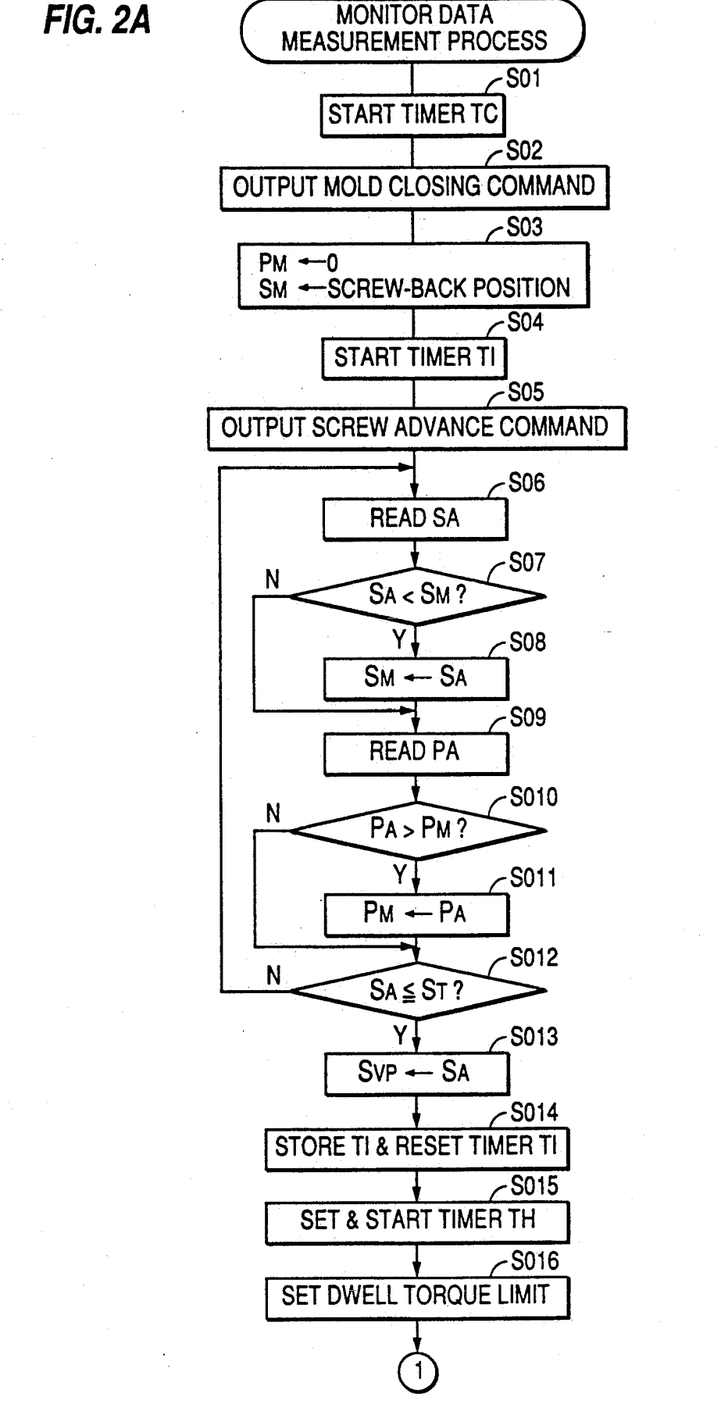
FIGS. 2A and 2B are flow charts showing a monitor data measurement process executed by means of numerical control devices provided individually for the injection molding machines.
Figure 2B:
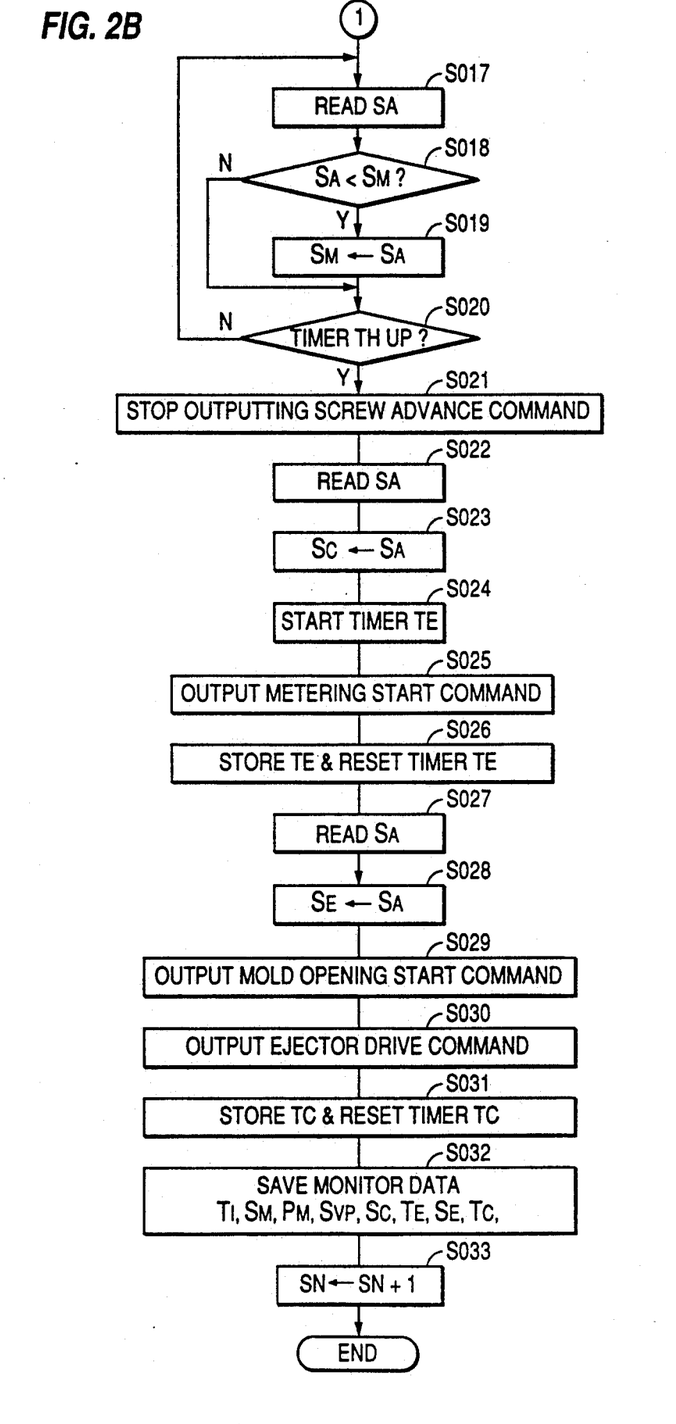

More specifically, during the execution of one molding cycle by means of each injection molding machine, a monitor data measurement process shown in FIGS. 2A and 2B is executed by means of the PMCCPU of the injection molding machine. At the start of one molding cycle in the first injection molding machine 7-1, for example, the PMCCPU starts a first timer TC for molding cycle time measurement (Step S01), and delivers a mold closing command to the NCCPU (Step S02). Then, the PMCCPU sets the value "0" as an initial value, which corresponds to the minimum allowable value of the actual maximum injection pressure obtained during a normal molding cycle, in a first register PM for storing the actual maximum injection pressure for one molding cycle, and also sets a screw-back position for the preceding molding cycle as an initial value, which corresponds to the maximum allowable value of the actual minimum cushioning volume for a normal molding cycle, in a second register SM for storing the actual minimum cushioning volume obtained during one molding cycle (Step S03).

In response to the mold closing command delivered in Step S02, a movable platen is driven in a mold closing direction, and then locked up. On confirming the delivery of a mold clamping completion signal, indicative of the lockup of the movable platen, from the NCCPU, the PMCCPU starts a second timer TI for injection time measurement (Step S04), and delivers a screw advance command to the NCCPU (Step S05). In response to the screw advance command, an injection stage is started. In the injection stage, speed control for the screw axis is carried out.

The PMCCPU reads a stored value SA in the current position storage register associated with the screw axis (Step S06), and determines whether or not the value of the current screw position SA is smaller than a stored value SM in the second register (Step S07). If the decision is YES, the stored value SM is replaced with the value SA (Step S08). Normally, the minimum cushioning volume SM is reloaded. In Step S09 which directly follows Step S07 or S08, the PMCCPU reads a current injection pressure PA from the pressure sensor 73 through an A/D converter, and determines whether or not the value of the current injection pressure PA is larger than a stored value PM in the first register (Step S010). If the decision is YES, the stored value PM is replaced with the value PA (Step S011). Normally, the maximum injection pressure PM is reloaded. Then, it is determined whether or not a screw position ST for switching from the injection stage to a dwell stage is reached by the screw (Step S012). If the decision is NO (SA>ST), the program returns to Step S06.

Thereafter, the injection stage advances, and in the meantime, Steps S06 to S012 are repeatedly executed, whereupon the stored values PM and SM in the first and second registers are updated as required. If it is concluded in Step S012 that the target injection-to-dwell switching position ST is reached, the PMCCPU loads the current screw position SA for the current point of time into a third register SVP for storing the actual injection-to-dwell switching position (Step S013). If the operation of the injection molding machine is normal, the actual switching position SVP loaded in the third register is substantially equal to the target switching position ST. If underweight, back flow or the like is caused, on the other hand, the value SVP sometimes may exceed the value ST by a large margin, depending on the timing for reading the current screw position SA. In addition to the storage of the actual injection-to-dwell switching position SVP, the PMCCPU loads an injection time TI, measured by means of the second timer when the target injection-todwell switching position ST is reached, into a fourth register for storing the actual injection time TI, and resets the second timer TI (Step S014). Then, the PMCCPU reads out a target dwell time, preset as one of the molding conditions, from the memory of the numerical control device, sets it in a third timer TH, and causes the third timer immediately to start timing (Step S015). Also, the PMCCPU sets a torque limit value corresponding to the target dwell pressure in the torque limit circuit of a servo circuit for screw-axis-direction drive (Step S016). Thereupon, the dwell stage is started. In the dwell stage, pressure control is effected in association with the screw axis.

During the execution of the dwell stage, the PMCCPU executes Steps S017 to S019 which correspond to Steps S06 to S08, respectively, thereby updating the minimum cushioning volume as required, and loads the second register SM with the minimum cushioning volume for both the injection and dwell stages. Normally, the screw advances beyond the injection-to-dwell switching position as the dwell pressure is applied to the screw in the dwell stage, so that the minimum cushioning volume is updated during the dwell stage. If breathing is hindered by, for example, corrosion of the gas vent formed in the mold 72, or if the dwell pressure is too low, the screw is pushed back by means of the resin pressure immediately after the start of the dwell stage. In this case, the minimum cushioning volume is not updated during the dwell stage, so that the minimum cushioning volume for the injection stage is maintained.

If the time-up of the third timer TH is confirmed in Step S020, the PMCCPU discriminates the passage of the target dwell time, and stops the delivery of the screw advance command (Step S021). Also, the PMCCPU reads the current screw position SA for the current point of time (Step S022), and loads this value SA into a fifth register SC for storing the cushioning volume obtained on completion of the dwell stage (Step S023). In general, the dwell pressure gradually decreases with the progress of the dwell time, so that the screw gradually moves back. Normally, therefore, the cushioning volume SC obtained on completion of the dwell stage is larger than the minimum cushioning volume SM.

Then, the PMCCPU starts a fourth timer TE for measuring the actual metering time (Step S024), and delivers a metering start command to the NCCPU (Step S025). Under the control of the NCCPU, the metering stage is executed according to a metering condition which is preset, as one of the molding conditions, in the memory of the numerical control device. When the screw reaches a target metering completion position, the NCCPU delivers a metering completion signal.

In response to the metering completion signal, the PMCCPU loads the actual metering time TE, measured by means of the fourth timer, into a sixth register, and then resets the fourth timer TE (Step S026). Further, the PMCCPU reads the current screw position SA for the current point of time (Step S027), and loads the value SA into a seventh register SE for storing the actual metering completion position (Step S028). The value of the actual metering completion position SE, which varies depending on the actual cushioning volume obtained on completion of the dwell stage or the like, is used as the initial value of the minimum cushioning volume for the next molding cycle, as mentioned before. After loading the actual metering completion position SE, the PMCCPU delivers a mold opening start command to the NCCPU (Step S029), and delivers an ejector drive command to the ejector (Step S030).

On completion of both a mold opening stage under the control of the NCCPU and a product take-out stage under the control of the PMCCPU, thereafter, the PMCCPU loads an eighth register with the present actual molding cycle time TC measured by means of the first timer, and resets the first timer TC (Step S031). Then, the PMCCPU loads a table, provided in the memory of the numerical control device, with the process parameter values for the present molding cycle, as the candidate monitor data, including the actual maximum injection pressure PM, actual minimum cushioning volume SM, actual injection time TI, actual minimum cushioning volume SC obtained on completion of the dwell stage, and actual metering time TE, stored in the first, second, fourth, fifth, and sixth registers, respectively (Step S032). Further, the PMCCPU increments a stored value SN in its built-in counter, which is indicative of the total shot number (the number of product-produced) for the first injection molding machine 7-1, by "1" (Step S033), whereupon the monitor data measurement process shown in FIG. 2 for the present molding cycle in the first injection molding machine 7-1 ends.

The aforesaid process data measurement process is executed with every molding cycle. As a result, the various process parameter values loaded in the memory table are reloaded every time the molding cycle ends.

Also in the second to M'th injection molding machines 7-2 to 7-M, the same monitor data measurement process is executed as for the first injection molding machine 7-1.

Figure 3:
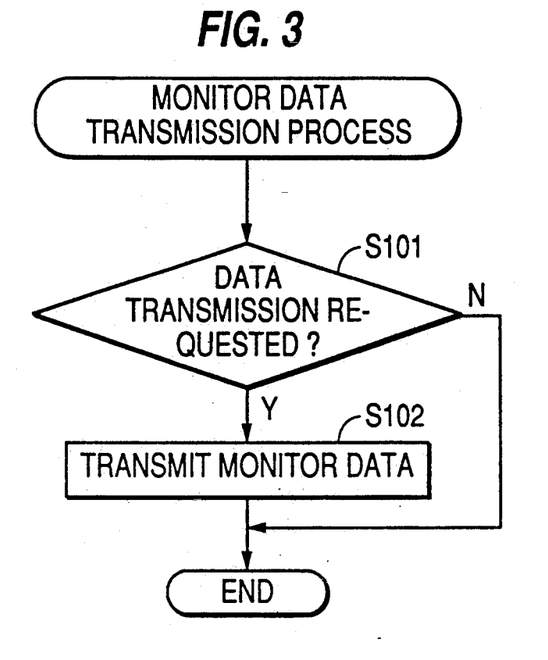
FIG. 3 is a flow chart showing a monitor data transmission process executed by means of the individual numerical control devices.

The molding monitor unit 1 automatically discriminates the maintenance timing for the expendable parts of the injection molding machines 7-1 to 7-M by the up-to-date process parameter values TI, SM, SC and TE for the individual injection molding machines. To attain this, the CPU 2 of the molding monitor unit 1 cyclically executes a monitor data reception process shown in FIG. 4. In association with this process, a monitor data transmission process shown in FIG. 3 is cyclically executed by means of the PMCCPU for each injection molding machine.

Figure 4:
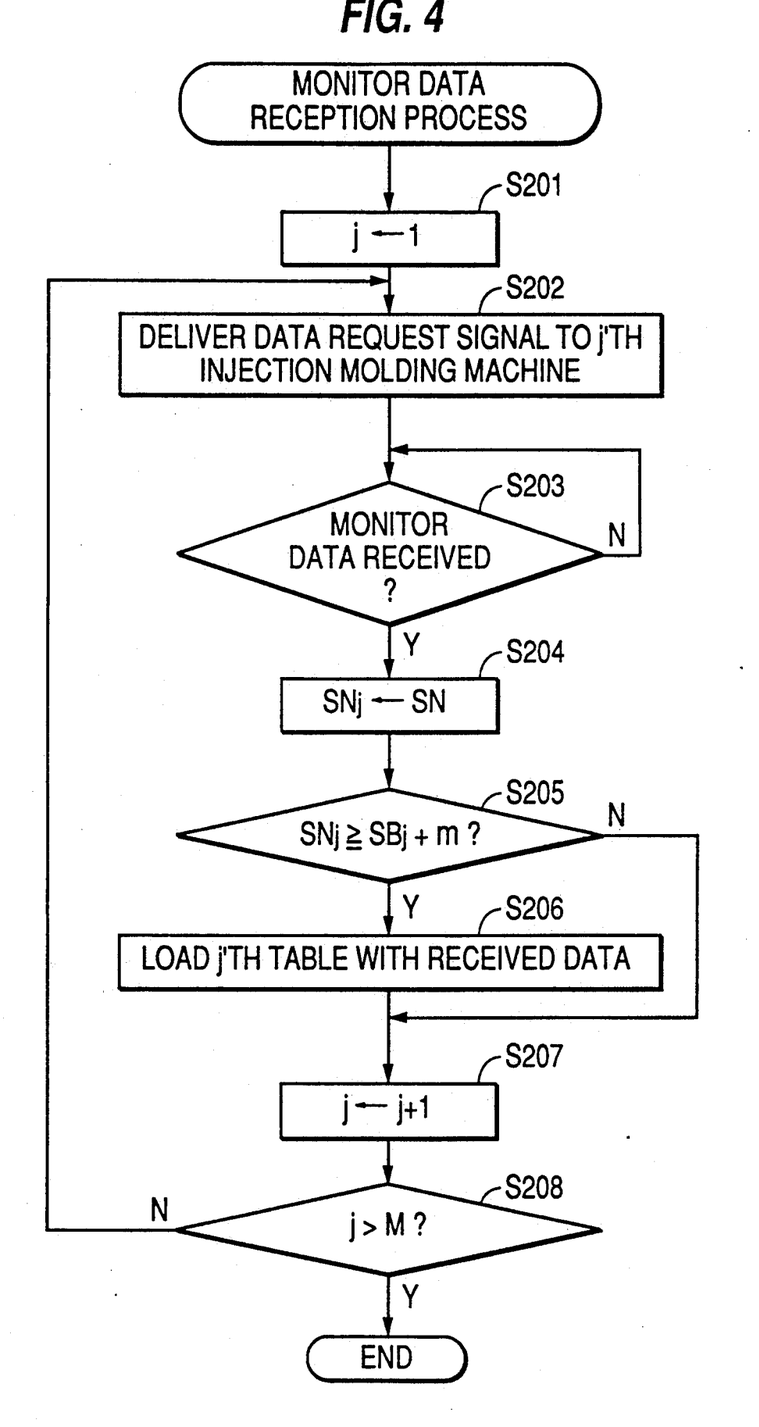
FIG. 4 is a flow chart showing a monitor data reception process executed by means of a molding monitor unit.

At the start of the monitor data reception process, the CPU 2 adjusts an index j for specifying one of the first to M'th injection molding machines 7-1 to 7-M to the initial value "1" (Step S201), and delivers a monitor data request signal to the numerical control device of the first injection molding machine 7-1 (j'th injection molding machine 7-1 in general) (Step S202). When the monitor data request is detected in Step S101 of the monitor data transmission process (FIG. 3), the PMCCPU of the first injection molding machine reads out the up-to-date process parameter values TI, SM, PM, SC and TE from the memory table of the numerical control device, and also reads out the total shot number SN from the built-in counter of the PMCCPU (Step S102).

On receiving the process parameter values TI, SM, PM, SC and TE and the total shot number SN (Step S203), the CPU 2 temporarily stores the total shot number SN as a total shot number SN1 for the first injection molding machine (total shot number SNj for the j'th injection molding machine in general) (Step S204), and then determines whether or not the value SN1 is equal to or larger than the sum of a predetermined value m and a stored value SB1 (SBj in general) in a corresponding one of M number of registers arranged individually in the RAMs 4 (Step S205). The initial value of the register value SBj is preset to "0".

If the decision in Step S205 is YES, the CPU 2 updates the register stored value SB1 to the value SN1 temporarily stored in Step S204, concluding that the timing for monitor data renewal is reached, and loads the process parameter values TI, SM, PM, SC and TE received in Step S203, as the up-to-date monitor data, into a corresponding one (first table in this case) of the first to M'th lookup tables arranged individually in the RAMs 4 (Step S206). If the decision in Step S205 is NO, on the other hand, it is concluded that the monitor data renewal timing is not reached yet, and the program proceeds to Step S207 (mentioned later) without the execution of Step S206. In this case, the process parameter values received in Step S203 and the shot number SN1, temporarily stored in Step S204 to be ready for the decision of the next monitor data renewal timing, are erased.

Figure 6:
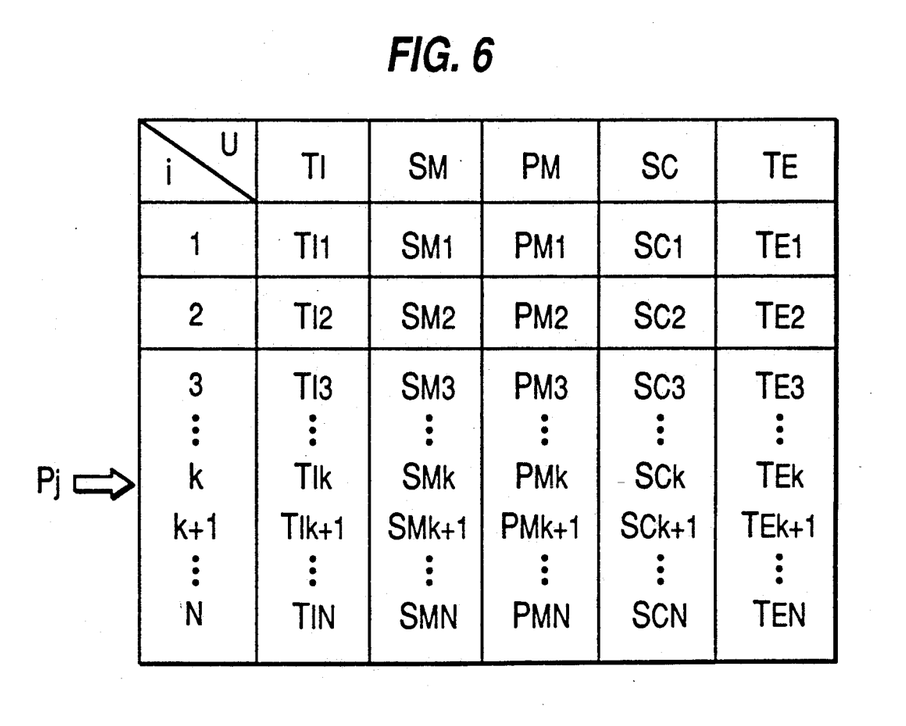
FIG. 6 is a conceptual diagram showing a lookup table for storing monitor data provided in the molding monitor unit.

The following is a description of a case in which it is concluded in Step S205 that the monitor data renewal timing is reached. As shown in FIG. 6, each of the first to M'th tables has first to N'th address regions for individually storing N number of sets of monitor data TIk, SMk, PMk, SCk and TEk (K=1 to N). That address region which corresponds to the last monitor data set loaded into the table is specified by means of a pointer Pj. In Step S206, therefore, the up-to-date monitor data are loaded into the address region of the table next to the address region specified by the pointer Pj. If the pointer Pj points to the N'th address region, the up-to-date monitor data are loaded into the first address region. Thus, a new monitor data set is loaded into the table to replace the oldest data set therein every time the molding monitor unit 1 receives the new monitor data set after the monitor data sets are loaded into all of the first to N'th address regions of the table, whereby N number of up-to-date monitor data sets are saved on a time-series basis. After the up-to-date monitor data set is loaded, the pointer Pj is updated to a value indicative of the address region loaded with the up-to-date monitor data set.

When the storage of the up-to-date monitor data in the RAMs 4 in Step S206 is finished, or if it is concluded in Step S205 that the monitor data renewal timing for the first injection molding machine (j'th injection molding machine in general) is not reached yet, the PMCCPU increments the index j by "1" (Step S207). Then, it is determined whether or not the updated value of the index j is larger than the total number M of the injection molding machines (Step S208). Since the decision is NO (j<M) in this case, the program returns to Step S202 mentioned before, whereupon a monitor data request is addressed to the second injection molding machine 7-2 specified by the updated pointer j (=2). In consequence, as described before with reference to FIG. 4, the received monitor data TI, SM, PM, SC and TE are loaded into the table in the RAM 4 if the monitor data renewal timing is reached. Likewise, monitor data reception processes for the third to M'th injection molding machines 7-3 to 7-M are executed in succession. When the end of the monitor data reception process for the M'th injection molding machine is discriminated in Step S208 of FIG. 4, the monitor data reception process for the present processing cycle is finished.

The above-described monitor data reception process is repeatedly executed with a considerably short cycle, and the monitor data TI, SM, PM, SC and TE for each of the first to M'th injection molding machines are loaded into a corresponding one of the first to M'th tables in the RAM 4 every time m number of molding cycles are executed for each injection molding machine.

Figure 5:
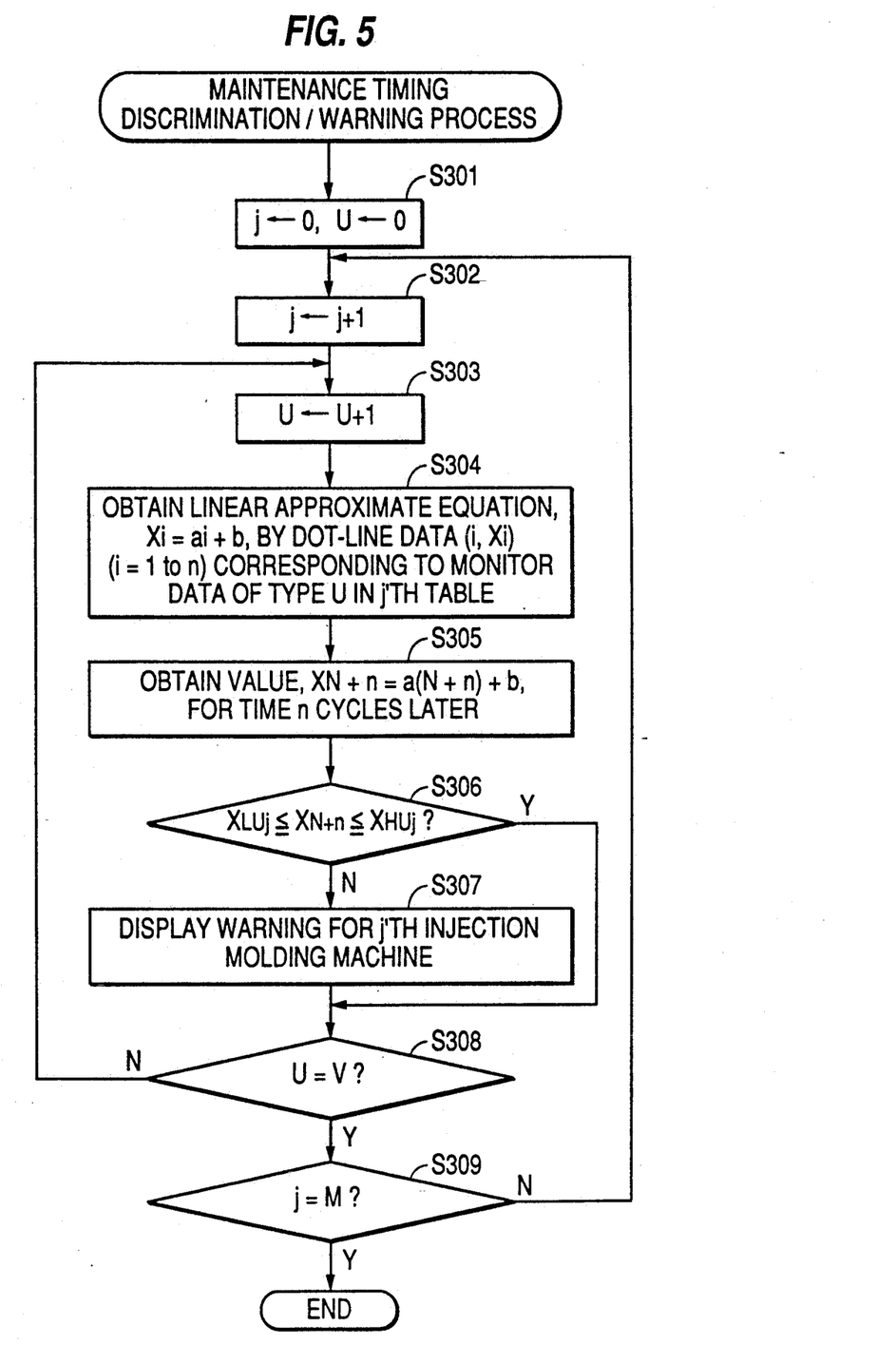
FIG. 5 is a flow chart showing an expendable parts maintenance timing discrimination/warning process executed by means of the molding monitor unit.

Further, the molding monitor unit 1 cyclically executes the process shown in FIG. 5 on the basis of the N number of sets of monitor data TIk, SMk, PMk, SCk and TEk (k=1 to N) at the maximum, obtained for each injection molding machine in the aforesaid manner, discriminates the degrees of deterioration of the various expendable parts of each injection molding machine, that is, the proper maintenance timing for the expendable parts, and warns of the arrival of the maintenance timing as required.

More specifically, every time a maintenance timing discrimination/warning process is started, the CPU 2 of the molding monitor unit 1 resets the respective initial values of the index j for specifying one of the first to M'th tables in the RAM 4 and an index U for specifying one of the five types of monitor data TI, SM, PM, SC and TE, which constitute the monitor data set, to "0" (Step S301), and increments the indexes j and U individually by "1" (Steps S302 and S303). Then, the CPU 2 reads, on a time-series basis, the monitor data TI, belonging to the first type (injection time) specified by the index U, from the first table specified by the index j (=1) and associated with the first injection molding machine 7-1, with reference to a pointer value P1 (Pj in general) for specifying the last monitor data set loaded into the table concerned.

Figure 7:
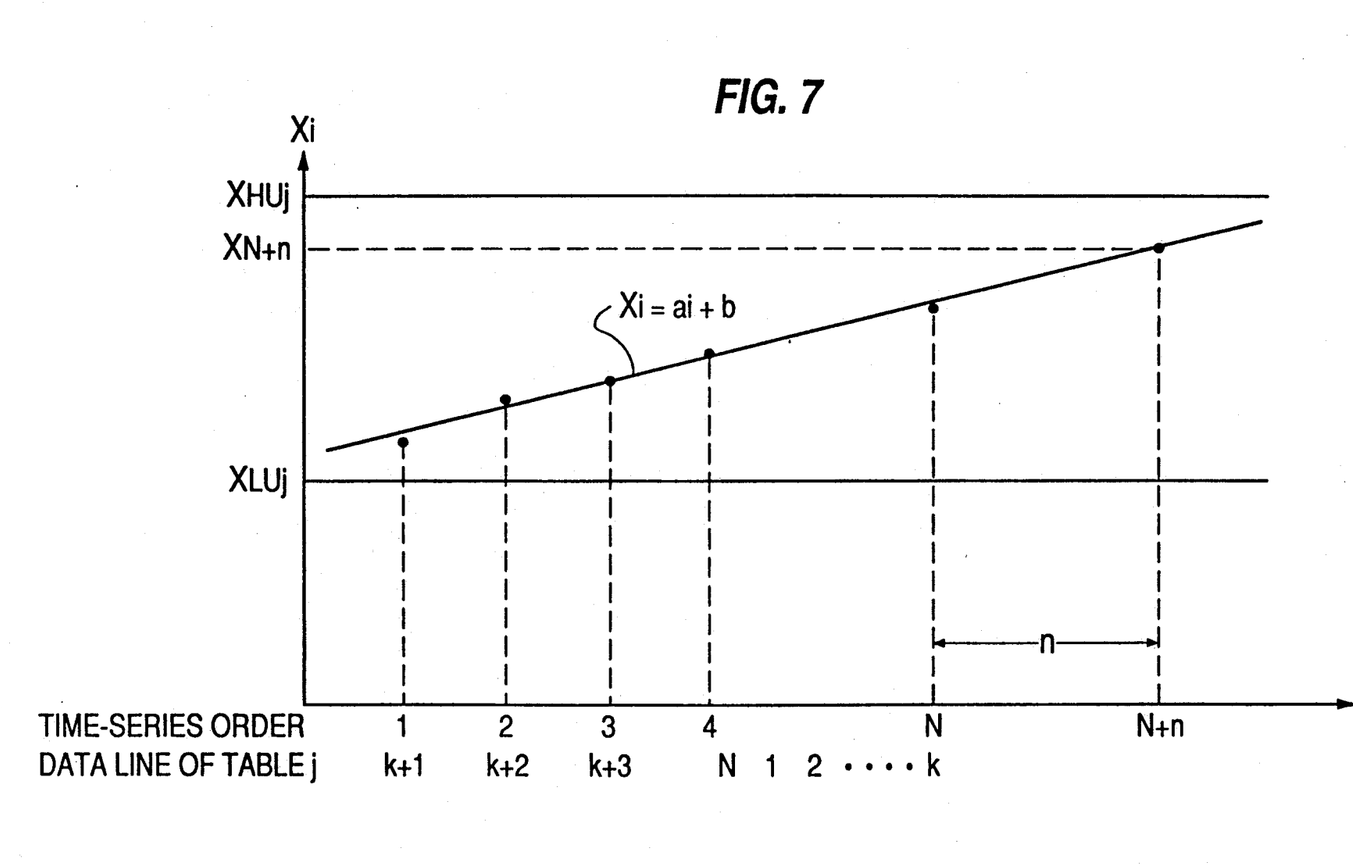
FIG. 7 is a graph conceptually illustrating a monitor data estimated value calculation process executed by means of the molding monitor unit.

When the N number of sets of monitor data are loaded into the first to N'th address regions of the first table, and if the pointer value P1 is "k", for example, the CPU 2 reads out injection times TIk+1 to TIN from the (k+1)'th to N'th address regions of the first table, in the order named, and then reads out injection times TI1 to TIk from the first to k'th address regions of the first table, in the order named. Further, the CPU 2 originates N number of sets of dot-line data (i, Xi) (i=1 to N) each including an integer (i=1 to N), indicative of the time-series order, and an injection time TIi corresponding thereto. As shown in FIG. 7, the injection time TIk+1 read out from the (k+1)'th address region of the first table corresponds to dot-line data (1, X1), while the injection time TIk read out from the k'th address region corresponds to dot-line data (N, XN).

The CPU 2 substitutes the dot-line data (i, Xi) (i=1 to N) successively into a linear regression equation based on the method of least squares, thereby obtaining an approximate equation of the first degree, $Xi=ai+b$, indicative of the transition trend of the actual injection time in the first injection molding machine 7-1 (Step S304). The dot-line data (i, Xi) (i=1 to N) are uniformly distributed on either side of the approximate equation of the first degree. Then, the CPU 2 substitutes a value (N+n) into the variable i of the approximate equation of the first degree, and calculates an estimated value (estimated value $XN+n$ ($=a(N+n)+b$) of the monitor data of a U'th type, in general) of the injection time TI for the point of time of monitor data detection later than the present point of time by a margin corresponding to n number of cycles ((m×n) number of shots) (Step S305). Further, the CPU 2 reads out the present upper and lower limit values (upper and lower limit values XHUj and XLUj of the monitor data of the U'th type, in general) of the injection time TI from the RAM 4, and determines whether or not the estimated value of the injection time TI is within its allowable range by comparing the estimated value with the upper and lower limit values (Step S306). If the decision is NO, the CPU 2 reads out a preset warning message from the RAM 4, and causes it to be displayed on the screen of the CRT display unit 6 (Step S307). The warning messages will be mentioned later. Then, the CPU 2 determines whether or not the index U is equal to the total number V (=5) of the types of monitor data (Step S308). If the decision in Step S306 is YES, on the other hand, the program proceeds to Step S308 without the execution of the process of step S307 for warning message display.

Since the decision in Step S308 is NO in this case, the program returns to Step S303, whereupon the index U is incremented by "1". As in the case of the injection time TI, thereafter, it is determined whether or not the estimated value of the minimum cushioning volume SM, specified by the updated index U (=2), is within its allowable range. If the estimated value is outside the allowable range, a warning message is displayed. Likewise, it is determined whether or not the respective estimated values of the maximum injection pressure PM, cushioning volume SC obtained on completion of the dwell stage, and metering time TE are within their respective allowable ranges every time the index U is updated to 3, 4 or 5, and warning messages are displayed as required. The CPU 2 checks the dot-line data for dispersion with respect to the cushioning volume SC and the metering time TE.

The following is a description of the warning messages. In general, if the breathing efficiency is lowered due to corrosion of the gas vent, the injection time TI or the minimum cushioning voluem SM gradually increases with the passage of time. If the gates of the mold are worn away, moreover, the maximum injection pressure PM gradually decreases with the passage of time. If the estimated value of the injection time TI or minimum cushioning volume SM for the first injection molding machine is larger than its upper limit value, therefore, a warning message, "INJECTION TIME FOR FIRST INJECTION MOLDING MACHINE TENDS TO INCREASE (CHECK GAS VENT)" or "MINIMUM CUSHIONING VOLUME FOR FIRST INJECTION MOLDING MACHINE TENDS TO INCREASE (CHECK GAS VENT)," is displayed. If the estimated value of the maximum injection pressure PM for the first injection molding machine is smaller than its lower limit value, moreover, a warning message, "MAXIMUM INJECTION PRESSURE FOR FIRST INJECTION MOLDING MACHINE TENDS TO DECREASE (CHECK GATES FOR WEAR)," is displayed. If the heating cylinder or the injection screw is worn away so that a back flow is produced, the cushioning volume SC obtained on completion of the dwell stage or the metering time TE is subject to dispersion. Accordingly, if the dot-line data associated with the cushioning volume SC or the metering time TE for the first injection molding machine is subject to dispersion, for example, a display message, "CUSHIONING VOLUME FOR FIRST INJECTION MOLDING MACHINE IS LIABLE TO DISPERSION (CHECK CYLINDER AND SCREW)" or "METERING TIME FOR FIRST INJECTION MOLDING MACHINE IS LIABLE TO DISPERSION (CHECK CYLINDER AND SCREW)," is displayed.

After the maintenance timing discrimination/warning process, based on the monitor data TI, SM, PM, SC and TE associated with the first injection molding machine 7-1, is finished, as described above, the CPU 2 determines whether or not the index j is equal to the total number M of the injection molding machines (Step S309). Since the decision is NO in this case, the index j is incremented by "1" (Step S302), and the maintenance timing discrimination/warning process based on the five types of monitor data associated with the second injection molding machine 7-2 is executed. Every time the index j is updated to "3", "4", or "5", moreover, similar processes for the third to M'th injection molding machines are executed in succession. When the processes for all the five types of monitor data for the M'th injection molding machine are finished, and if the decision in Step S309 is YES, the maintenance timing discrimination/warning process of FIG. 5 for the present processing cycle is completed.

Thus, according to the embodiment described above, the degrees of deterioration of the expendable parts can be automatically discriminated in accordance with the respective estimated values of the various monitor data for the point of time later than the present point of time by a margin corresponding to n number of cycles ($(m \times n)$ number of shots), calculated on the basis of N number of sets of up-to-date monitor data, and the occurrence of dispersion in the monitor data, and can automatically display a warning message to demand maintenance and inspection of an expendable part before the properties of the expendable part worsen so much that defective molding is caused. Thus, there is a lot of time to spare before the expandable part comes actually to require maintenance and inspection after the warning message is displayed, so that there is no possibility of defectives being unexpectedly manufactured.

The present invention is not limited to the embodiment described above, and various modifications may be effected therein.

In the above embodiment, for example, the injection time, minimum cushioning volume, maximum injection pressure, cushioning volume obtained on completion of the dwell stage, and metering time are detected as the monitor data. Alternatively, however, various detectable physical variables, which vary depending on the deterioration of the various expendable parts, may be detected to be used for the discrimination of the degrees of deterioration of the corresponding expendable parts. For example, the degree of the wastage of a band heater or mold heater can be estimated by detecting the band heater temperature, mold heater temperature, band heater conduction time, or mold heater conduction time of the injection molding machine.

In the above embodiment, moreover, the necessity of the warming message display is determined by the estimated value of the monitor data calculated according to the approximate equation of the first degree, $X_i = ai + b$. Alternatively, however, the inclination a of the straight line expressed by the approximate equation of the first degree may be used as a criterion. In this case, the maximum and minimum allowable values of the inclination of the straight line are used in place of the upper and lower limit values, respectively, of the estimated value. Alternatively, the difference between the respective inclinations of straight lines calculated individually in adjacent discrimination cycles may be used as the criterion. In this case, the maximum and minimum allowable values of the difference in inclination between the straight lines are used.

In the embodiment described above, the warning message is displayed when the estimated value of the monitor data is deviated from one allowable range. Alternatively, however, a plurality of allowable range of different extents may be set so that a corresponding one of warning messages different in the degree of emergency, with respect to the maintenance and inspection of the expendable parts, can be displayed depending on the allowable range from which the estimated value of the monitor data is deviated. Also in the two modifications described above, in which the inclination of the straight line or the difference in inclination between the straight lines is used as the criterion, warnings of different degrees of emergency may be issued.

Although the transition trend of the monitor data is represented by the approximate equation of the first degree in the above embodiment, furthermore, it may alternatively be represented by an approximate equation of the second or higher degree. An approximate equation of the first degree is suited for the estimation of the transition of monitor data which tends to increase or decrease gradually with the passage of time, while an approximate equation of higher order is suited for estimation for monitor data which is liable to dispersion.

In the foregoing embodiment, moreover, it is determined whether or not the estimated value of the monitor data for the point of time later than the present point of time by a margin corresponding to n number of discrimination cycles is deviated from its allowable range. Alternatively, however, the point of time when the estimated value of the monitor data starts to deviate from the allowable range may be estimated. In this case, an unknown quantity i, which is indicative of the point of time when the estimated value of the monitor data starts to deviate from its allowable range, is obtained from an equation obtained by substituting a corresponding one of the upper and lower limit values XHUj and XLUj, selected depending on the direction of the inclination a of the straight line represented by the approximate equation of the first degree, $Xi=ai+b$, into this approximate equation of the first degree, and a required warning message is displayed. For example, the shot number, $M \times n$, obtained before the point of time when the estimated value of the maximum injection pressure for the first injection molding machine starts to deviate from its allowable range, is calculated, and a warning message, "REMAINDER OF LIFE OF MOLD GATES OF FIRST INJECTION MOLDING MACHINE IS APPROX. $(m \times n)$ NUMBER OF SHOTS," is displayed.

Although the present invention is applied to electrically-operated injection molding machines according to the embodiment described herein, it may be also applied to hydraulically-operated injection molding machines. In the above embodiment, moreover, the expendable parts maintenance timing discrimination/warning process for a group of injection molding machines are executed en bloc by means of the molding monitor unit. If the numerical control devices attached to the injection molding machines have a sufficient capacity to process, however, the above process may be executed by means of the numerical control devices. Further, various display means, such as buzzers, lamps, etc., may be used in place of the CRT display unit according to the above embodiment. Furthermore, the graph shown in FIG. 7 may be printed out by means of a printer unit or plotter unit.

What is claimed is:

1. A discrimination method for timing of maintenance for an injection molding machine having expendable parts, comprising steps of:
   (a) storing in a storage unit, on a time-series basis, a plurality of sets of up-to-date monitor data values, each set associated with a molding cycle of the injection molding machine and related to the expendable parts thereof, respective values of the up-to-date monitor data for each expendable part being cyclically detected during operation of the injection molding machine;
   (b) automatically cyclically discriminating transition trends of the up-to-date monitor data in dependence upon the respective values for the parts cyclically read out on the time-series basis from the storage unit;
   (c) automatically cyclically determining whether a predetermined deterioration level is reached by at least one of the expendable parts in dependence upon the transition trends discriminated in step (b); and
   (d) issuing a warning when it is concluded that the predetermined deterioration level is reached by the at least one of the expendable parts.

2. A discrimination method according to claim 1, wherein said discriminating in step (b) includes a sub-step of obtaining at a present point in time an estimated value of the up-to-date monitor data for a predetermined period of time after the present point in time, in dependence upon the respective values for the parts.

3. A discrimination method according to claim 1, wherein said discriminating in step (b) includes a sub-step of (b1) obtaining an approximate equation for each of the transition trends of the up-to-date monitor data in dependence upon the respective values for the parts.

4. A discrimination method according to claim 3, wherein said discriminating in step (b) further includes a sub-step of (b2) obtaining at a present point in time an estimated value of the up-to-date monitor data for a predetermined period of time after the present point in time, using the approximate equation.

5. A discrimination method according to claim 4, wherein said determining in step (c) includes a sub-step of concluding that the predetermined deterioration level is reached by the at least one expendable part when the estimated value of the up-to-date monitor data of the at least one expendable part deviates from an allowable range for the up-to-date monitor data.

6. A discrimination method according to claim 4,
   wherein said determining in step (c) includes a sub-step of determining whether the estimated value of the up-to-date monitor data deviates from any one of a plurality of allowable ranges of different extents for the up-to-date monitor data, and
   wherein said issuing in step (d) includes a sub-step of issuing a warning corresponding to one of the allowable ranges from which the estimated value deviates, from among a plurality of warnings different in degree of emergency.

7. A discrimination method according to claim 3, wherein the approximate equation is a first degree equation.

8. A discrimination method according to claim 3, wherein the approximate equation is a first degree equation, and wherein said determining in step (c) includes concluding that the predetermined deterioration level is reached by the at least one expendable part when a straight line expressed by the approximate equation has an inclination which deviates from an allowable range for the inclination of the straight line.

9. A discrimination method according to claim 8, wherein said determining in step (c) includes a sub-step of determining whether the inclination of the straight line deviates from any one of a plurality of allowable ranges of different extents for the inclination of the straight line, and
wherein said issuing in step (d) includes a sub-step of issuing a warning corresponding to at least one of the allowable ranges from which the inclination of the straight line deviates, from among a plurality of warnings different in degree of emergency.

10. A discrimination method according to claim 3, wherein the approximate equation is a first degree equation, and
wherein said determining in step (c) includes concluding that the predetermined deterioration level is reached by the at least one expendable part when a difference between respective inclinations of straight lines expressed by the approximate equation obtained in two successive cycles deviates from an allowable range for the difference in inclination between the straight lines.

11. A discrimination method according to claim 10, wherein said determining in step (c) includes a sub-step of determining whether the difference in inclination between the straight lines deviates from any one of a plurality of allowable ranges of different extents, and
wherein said issuing in step (d) includes a sub-step of issuing a warning corresponding to at least one of the allowable ranges from which the difference in inclination between the straight lines deviates, among a plurality of warnings different in degree of emergency.

* * * * *